US011527336B2

(12) United States Patent
Yang et al.

(10) Patent No.: US 11,527,336 B2
(45) Date of Patent: Dec. 13, 2022

(54) HIGH TEMPERATURE RESISTANT WIRE AND DETECTOR USING THE SAME

(71) Applicants: Tsinghua University, Beijing (CN); HON HAI PRECISION INDUSTRY CO., LTD., New Taipei (TW)

(72) Inventors: Xin-He Yang, Beijing (CN); Peng Liu, Beijing (CN); Shi-Wei Lv, Beijing (CN); Duan-Liang Zhou, Beijing (CN); Chun-Hai Zhang, Beijing (CN); Feng Gao, Yantai (CN); Jian-Dong Gao, Yantai (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 765 days.

(21) Appl. No.: 16/448,104

(22) Filed: Jun. 21, 2019

(65) Prior Publication Data

US 2020/0243214 A1 Jul. 30, 2020

(30) Foreign Application Priority Data

Jan. 25, 2019 (CN) .............................. 201910073721

(51) Int. Cl.
*H01B 3/12* (2006.01)
*G01D 11/00* (2006.01)
*H01B 1/04* (2006.01)

(52) U.S. Cl.
CPC .............. *H01B 3/12* (2013.01); *G01D 11/00* (2013.01); *H01B 1/04* (2013.01)

(58) Field of Classification Search
CPC ........................................................ H01B 3/12
See application file for complete search history.

(56) References Cited

U.S. PATENT DOCUMENTS

2009/0255706 A1  10/2009  Jiang et al.
2014/0099852 A1*  4/2014  Guo .................. H01J 3/021
                                                    977/847

(Continued)

FOREIGN PATENT DOCUMENTS

CN     105097065    11/2015
CN     205788617    12/2016

(Continued)

OTHER PUBLICATIONS

Thermodynamics of Chemical Reaction of Boron Nitride Ceramics Prepared by CVD, Science and Technology & Innovation, Apr. 4, 2018, pp. 67-68, HaiTao Ren.

(Continued)

*Primary Examiner* — Chau N Nguyen
(74) *Attorney, Agent, or Firm* — ScienBiziP, P.C.

(57) ABSTRACT

A high temperature resistant wire is provided. The high temperature resistant wire comprises a carbon nanotube wire and a boron nitride layer coated on a surface of the carbon nanotube wire. The boron nitride layer is coaxially arranged with the carbon nanotube wire. A working temperature of the high temperature resistant wire in the air ranges from 0K to 1600K. A working temperature of the high temperature resistant wire in vacuum ranges from 0K to 2500K. A detector using the high temperature resistant wire is also provided.

18 Claims, 11 Drawing Sheets

(56) References Cited

U.S. PATENT DOCUMENTS

| | | | | |
|---|---|---|---|---|
| 2014/0231118 A1* | 8/2014 | Koziol | ................. | H01B 13/06 |
| | | | | 427/113 |
| 2015/0310957 A1 | 10/2015 | Qian et al. | | |
| 2018/0237295 A1* | 8/2018 | Kumagai | ................ | D02G 3/16 |

FOREIGN PATENT DOCUMENTS

| | | | |
|---|---|---|---|
| CN | 205920800 | | 2/2017 |
| CN | 106934975 | | 7/2017 |
| JP | 2004-218144 | * | 8/2004 |
| TW | 200945372 | | 11/2009 |

OTHER PUBLICATIONS

Electronic, Structural, and Thermal Properties of a Nanocable Consisting of Carbon and BN Nanotubes, JETP Letters, vol. 80, No. 9, 2004, pp. 608-611. A. N. Enyashin.

* cited by examiner

US 11,527,336 B2

HIGH TEMPERATURE RESISTANT WIRE AND DETECTOR USING THE SAME

CROSS-REFERENCE TO RELATED APPLICATIONS

This application claims all benefits accruing under 35 U.S.C. § 119 from China Patent Application No. 201910073721.8, filed on Jan. 25, 2019, in the China National Intellectual Property Administration, the contents of which are hereby incorporated by reference.

FIELD

The present disclosure relates to high temperature resistant wire and detector using the high temperature resistant wire.

BACKGROUND

High temperature resistant wires are important for detecting extremely high temperature conditions. For example, the high temperature resistant wires are required in solar energy exploration, fire scene detection, high temperature material processing, and aerospace field.

However, conventional high temperature resistant wires become less resistant to corrosion and aging at high temperatures, especially when the temperature is greater than 800K, wherein conventional high temperature resistant wires can not work normally. Moreover, conventional high temperature resistant wires have large volume; thus conventional high temperature resistant wires are not suitable for micro devices where small volumes are required.

BRIEF DESCRIPTION OF THE DRAWINGS

Implementations of the present technology will now be described, by way of embodiments, with reference to the attached figures, wherein.

DETAILED DESCRIPTION

Figure 1:
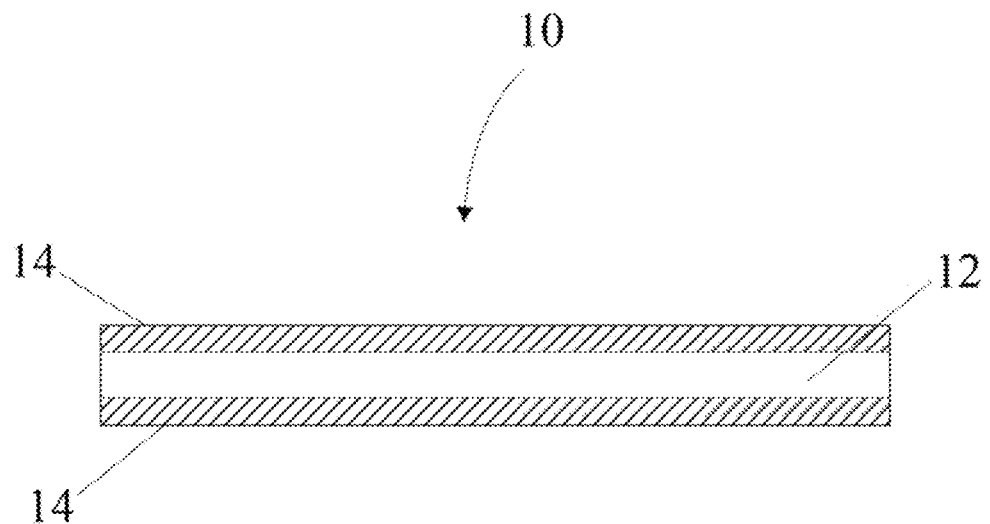
FIG. 1 shows a section structure schematic diagram of one embodiment of a high temperature resistant wire.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

FIG. 1 illustrates a high temperature resistant wire 10 of one embodiment. The high temperature resistant wire 10 comprises a carbon nanotube wire 12 and a boron nitride layer 14. The boron nitride layer 14 is coated on a surface of the carbon nanotube wire 12, and the boron nitride layer 14 is coaxially arranged with the carbon nanotube wire 12. The carbon nanotube wire 12 is used to conduct. The boron nitride layer 14 is used to insulate and prevent the carbon nanotube wire 12 from being oxidized and corroded. A highest temperature at which the high temperature resistant wire 10 can work normally in the air is 1600K. A highest temperature at which the high temperature resistant wire 10 can work normally in vacuum is 2500K. In one embodiment, the high temperature resistant wire 10 just consists of the carbon nanotube wire 12 and the boron nitride layer 14.

In one embodiment, the boron nitride layer 14 is a continuous boron nitride layer. The surface of the carbon nanotube wire 12 is completely covered by the boron nitride layer 14, and the carbon nanotube wire is not exposed outside.

A diameter of the high temperature resistant wire 10 can be adjusted according to actual needs. In one embodiment, the diameter of the high temperature resistant wire 10 ranges from 0.15 millimeters to 0.65 millimeters. In one embodiment, the diameter of the high temperature resistant wire 10 ranges from 0.17 millimeters to 0.38 millimeters. A length of the high temperature resistant wire 10 can be adjusted according to actual needs. In one embodiment, the length of the high temperature resistant wire 10 ranges from 15 millimeters to 35 millimeters. In one embodiment, the length of the high temperature resistant wire 10 ranges from 19.5 millimeters to 30 millimeters. In one embodiment, the diameter of the high temperature resistant wire 10 is 0.21 millimeters, and the length of the high temperature resistant wire 10 is 19 millimeters.

A working temperature range of the high temperature resistant wire 10 in the air ranges from 0K to 1600K. In one embodiment, the working temperature range of the high temperature resistant wire 10 in the air ranges from 500K to 1600K. In one embodiment, the working temperature range of the high temperature resistant wire 10 in the air ranges from 800K to 1600K. In some embodiments, the working temperature range of the high temperature resistant wire 10 in the air is 600K, 700K, 800K, 1000K, 1200K, 1400K or 1500K. A working temperature range of the high temperature resistant wire 10 in vacuum ranges from 0K to 2500K. In one embodiment, the working temperature range of the high temperature resistant wire 10 in vacuum ranges from 800K to 2500K. In one embodiment, the working temperature range of the high temperature resistant wire 10 in vacuum ranges from 1200K to 2500K. In some embodiments, the working temperature range of the high temperature resistant wire 10 in vacuum is 900K, 1000K, 1400K, 1600K, 1800K, 1900K or 2200.

The carbon nanotube wire 12 comprises a plurality of carbon nanotubes, and the plurality of carbon nanotubes are joined end-to-end by van der Waals force to form a macroscopic linear structure. The plurality of carbon nanotubes are pure, referring that the plurality of carbon nanotubes are not modified by any physical or chemical method and contain no measurable amount of impurities, such as amorphous carbon, residual catalyst metal particles or the like. The carbon nanotube wire 12 has excellent flexibility and electrical conductivity, and the carbon nanotube wire 12 can be heated into incandescence in vacuum, therefore, the carbon nanotube wire 12 can be used as a conductor at high temperatures. In one embodiment, the carbon nanotube wire 12 consists of the plurality of carbon nanotubes.

The carbon nanotube wire 12 can be an untwisted carbon nanotube wire or a twisted carbon nanotube wire.

Figure 2:
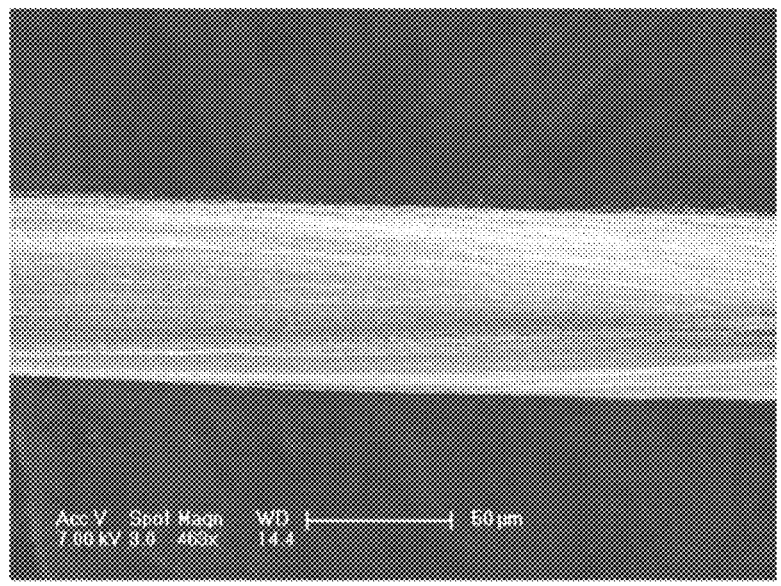
FIG. 2 shows a scanning electron micrograph (SEM) image of an untwisted carbon nanotube wire.

FIG. 2 illustrates that in one embodiment the carbon nanotube wire is the untwisted carbon nanotube wire. The untwisted carbon nanotube wire includes a plurality of carbon nanotubes substantially oriented along a length of the untwisted carbon nanotube wire. The untwisted carbon nanotube wire can be formed by treating a drawn carbon nanotube film with a volatile organic solvent. The drawn carbon nanotube film can be formed by drawing a film from a carbon nanotube array; the drawn carbon nanotube film is capable of being a free-standing structure. The drawn carbon nanotube film includes a plurality of carbon nanotube segments joined end-to-end by van der Waals force. Each carbon nanotube segment includes a plurality of carbon nanotubes substantially parallel to each other, and combined by van der Waals force. The drawn carbon nanotube film is treated by applying an organic solvent to the drawn carbon nanotube film to soak the entire surface of the drawn carbon nanotube film. After being soaked by the organic solvent, the adjacent parallel carbon nanotubes in the drawn carbon nanotube film will bundle together when the organic solvent volatilizes, due to the surface tension of the organic solvent, and thus, the drawn carbon nanotube film will be shrunk into the untwisted carbon nanotube wire. The organic solvent can be volatile organic solvents, such as ethanol, methanol, acetone, dichloroethane or chloroform. Compared with the drawn carbon nanotube film, a specific surface area of the untwisted carbon nanotube wire will decrease, and a viscosity of the untwisted carbon nanotube wire will increase.

Figure 3:
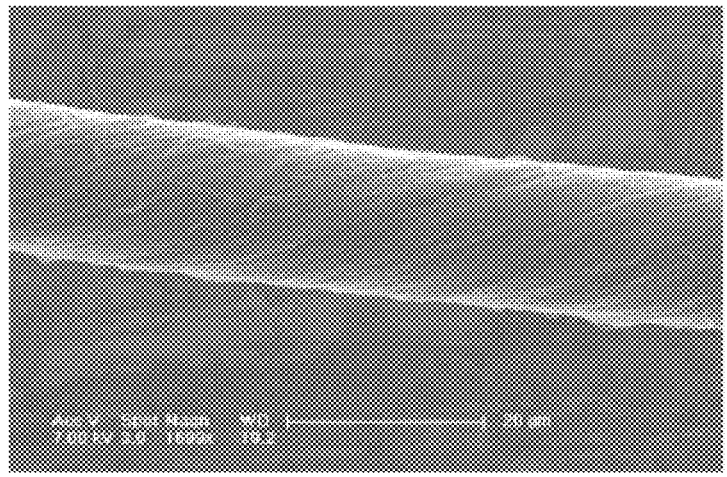
FIG. 3 shows a scanning electron micrograph (SEM) image of a twisted carbon nanotube wire.

FIG. 3 illustrates that in one embodiment the carbon nanotube wire is the twisted carbon nanotube wire. The twisted carbon nanotube wire includes a plurality of carbon nanotubes spirally arranged along an axial direction of the twisted carbon nanotube wire. The twisted carbon nanotube wire is formed by twisting a carbon nanotube film. The carbon nanotube film can be drawn from the carbon nanotube array. The carbon nanotube film includes a plurality of carbon nanotubes parallel with each other. The plurality of carbon nanotubes in the carbon nanotube film are substantially oriented along an axial direction of the carbon nanotube film, and joined end-to-end by van der Waals force in the axial direction of the carbon nanotube film. Therefore, when the carbon nanotube film is twisted, the plurality of carbon nanotubes in the twisted carbon nanotube wire are spirally arranged along the axial direction, in an end to end arrangement by van der Waals forces, and extends in a same direction.

Examples of the method of making the carbon nanotube wire 12 are taught by U.S. Pat. No. 7,045,108 to Jiang et al. and U.S. Pat. No. 8,602,765 to Jiang et al.

A diameter of the carbon nanotube wire 12 can be adjusted according to actual needs. In one embodiment, the diameter of the carbon nanotube wire 12 ranges from 0.05 millimeters to 0.25 millimeters. If the diameter of the carbon nanotube wire 12 is too large, such as larger than 0.25 millimeters, a calorific value of the carbon nanotube wire 12 will increase during use, and the overload performance of the carbon nanotube wire 12 will be affected; and the quality of the carbon nanotube wire 12 is too large. If the diameter of the carbon nanotube wire 12 is too small, such as smaller than 0.05 millimeters, a current of the carbon nanotube wire 12 is too small, affecting the conductivity. In one embodiment, the diameter of the carbon nanotube wire 12 ranges from 0.07 millimeters to 0.12 millimeters.

In one embodiment, the carbon nanotube wire 12 is the twisted carbon nanotube wire, the diameter of the carbon nanotube wire 12 is 0.10 millimeters, and the length of the carbon nanotube wire 12 is 19.00 millimeters.

The boron nitride layer 14 can be hexagonal boron nitride (H-BN), rhombohedral boron nitride (R-BN), cubic boron nitride (C-BN), or wurtzite boron nitride (W-BN). In one embodiment, the boron nitride layer 14 is an H-BN layer. The H-BN layer can be deposited on the surface of the carbon nanotube wire 12 by chemical vapor deposition (CVD) method. The h-BN layer is epitaxial grown on the carbon nanotube wire 12 in a high temperature (such as 1500° C.) low pressure furnace with the boron trichloride and ammonia gas for about 40 minutes. H-BN has super strong covalent bonds, large band gaps and layered structure, therefore, H-BN has good corrosion resistance, ablation resistance and insulation at high temperatures. H-BN has light weight, chemical inertness, excellent mechanical properties, high thermal conductivity and high temperature stability; and H-BN has good compatibility with carbon nanotubes, therefore, the high temperature resistant wire 10 is not easily oxidized and ablated when it is used at high temperature, and the high temperature resistant wire 10 has excellent thermal stability.

In one embodiment, a thickness of the boron nitride layer 14 ranges from 0.05 millimeters to 0.20 millimeters. In one embodiment, a thickness of the boron nitride layer 14 ranges from 0.07 millimeters to 0.14 millimeters. In one embodiment, the boron nitride layer 14 is an H-BN layer with a thickness of 0.55 millimeters.

Figure 4:
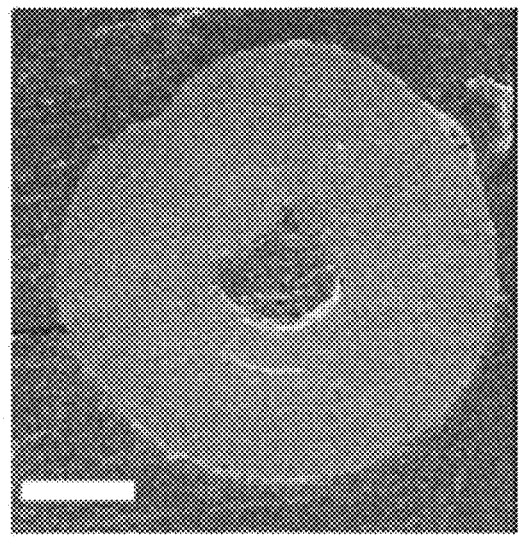
FIG. 4 shows a scanning electron microscope (SEM) image of a cross section of the high temperature resistant wire according to FIG. 1.

FIG. 4 shows a scanning electron microscope (SEM) image of a cross section of the high temperature resistant wire. It can be seen that the H-BN layer is coaxially arranged with the carbon nanotube wire, and the H-BN layer is uniformly coated on the surface of the carbon nanotube wire.

Figure 5:
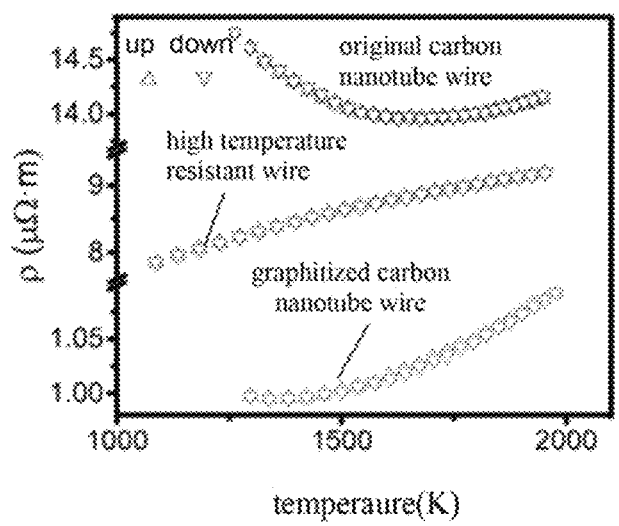
FIG. 5 shows curves of resistivity vs. temperature of a high temperature resistant wire, a graphitized carbon nanotube wire and an original carbon nanotube wire.

FIG. 5 shows curves of resistivity vs. temperature of the high temperature resistant wire, graphitized carbon nanotube wire and original carbon nanotube wire. The diameter and length of the carbon nanotube wire of the high temperature resistant wire is the same as the diameter and length of the graphitized carbon nanotube wire and the original carbon nanotube wire. Graphitized carbon nanotube wire refers that the carbon nanotubes of the carbon nanotube wire of the high temperature resistant wire are completely graphitized. Original carbon nanotube wire refers the carbon nanotube wire of the high temperature resistant wire. It shows that in the temperature range of 1000K to 2000K, the resistance curve of the high temperature resistant wire with temperature is substantially the same as the resistance curve of the graphitized carbon nanotube wire with temperature. However, the resistivity of the original carbon nanotube wire decreases with increasing temperature from 1200K to 1600K, and increases with increasing temperature from 1600K to 2000K. It can also be seen that at the same temperature, the resistivity of the high temperature resistant wire is less than the resistivity of the original carbon nanotube. It can be seen that some carbon nanotubes are graphitized during the process of growing H-BN on the surface of carbon nanotube wire, which improves the conductivity of carbon nanotube wire.

Figure 6:
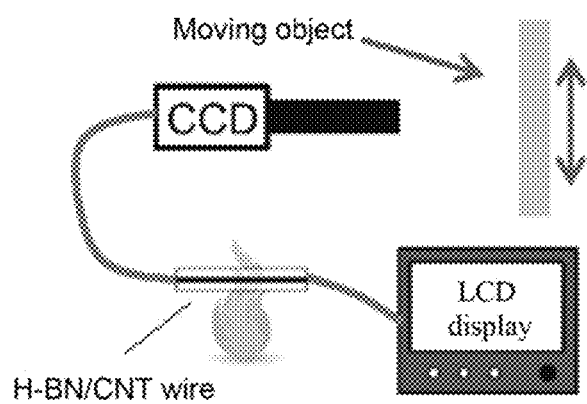
FIG. 6 shows a schematic diagram of signal transmission capability of the high temperature resistant wire according to FIG. 1 at high temperature.
Figure 7:
FIG. 7 is an experimental photo of signal transmission of a high temperature resistant wire of one embodiment at a high temperature.
Figure 8:
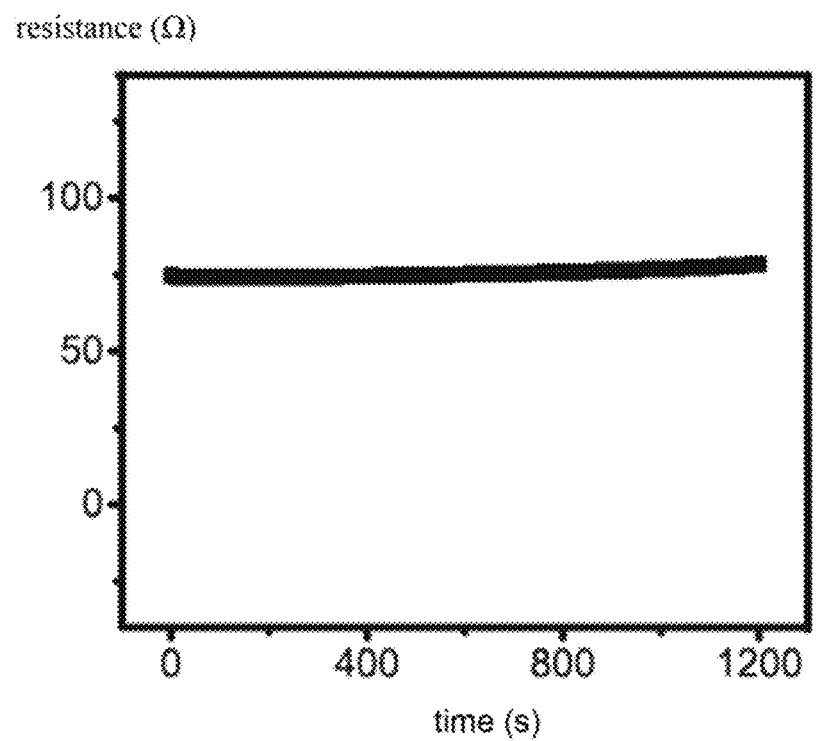
FIG. 8 shows a curve of resistance vs. time of a high temperature resistant wire of one embodiment in the air of 1220° C.

FIG. 6 shows a schematic diagram of signal transmission capability of the high temperature resistant wire at high temperature. One end of the high temperature resistant wire is connected to the CCD camera, the other end is connected to the LCD display, and the high temperature resistant wire is burned with a liquefied petroleum gas flame. FIG. 7 shows that when the temperature reaches 1200° C., the high temperature resistant wire can transmit video signals normally. FIG. 8 shows that the high temperature resistant wire is kept in the air of 1220° C. for 20 min, and the resistance of the high temperature resistant wire is stable and substantially unchanged. FIGS. 6-8 illustrate that the high temperature resistant wire has excellent electrical conductivity at a temperature of about 1200° C.

Figure 9:
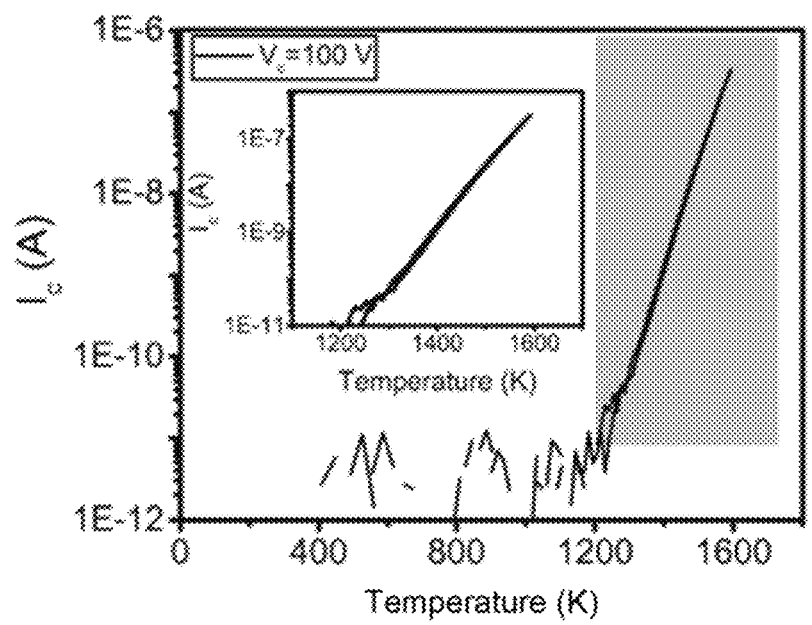
FIG. 9 shows a curve of thermal electron emission current vs. temperature of a high temperature resistant wire of one embodiment.
Figure 10:
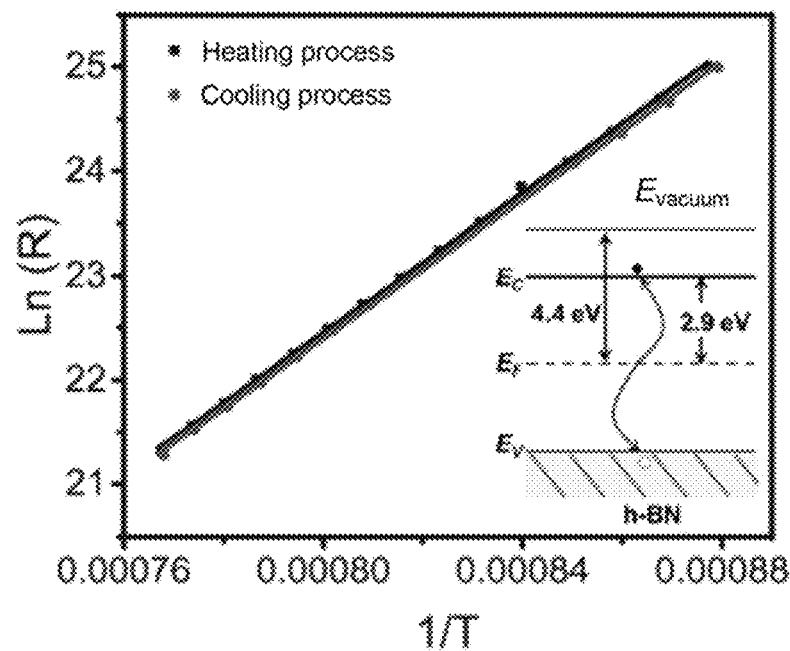
FIG. 10 shows a curve of resistance vs. temperature of a high temperature resistant wire of one embodiment.

Referring to FIG. 9, a source meter, Keithley 2200, is used to apply voltage on the high temperature resistant wire to heat the high temperature resistant wire. A metal foil is used to collect the thermionic emission electrons, connected with another source meter Keithley 237. FIG. 9 shows that when the temperature reaches 1600K, the thermal electron emission current of the high temperature resistant wire is only $10^{-7}$ A, which illustrates that at high temperature, the heat conduction through the H-BN layer to the external metal foil is small, and the heat loss of the high temperature resistant wire is small. Therefore, the effective heat conductivity of the high temperature resistant wire is high. Referring to FIG. 10, coating a carbon nanotube film on an outer surface of the high temperature resistant wire as a probe electrode, to test a change in resistance with the reciprocal of temperature of the high temperature resistant wire. It can be seen that the resistance $L_n(R)$ of the high temperature resistant wire increases linearly with an increase of $1/T$, the resistance of the high temperature resistant wire is about $6.7 \times 10^8 \Omega$ at 1302K, which illustrates that even at high temperatures, the H-BN layer still maintains good insulation properties. Inset is the energy band diagrams of the H-BN layer, it can be seen that the work function of the H-BN layer is 4.4 eV, the Fermi level is 2.9 eV below the conduction band.

Figure 11:
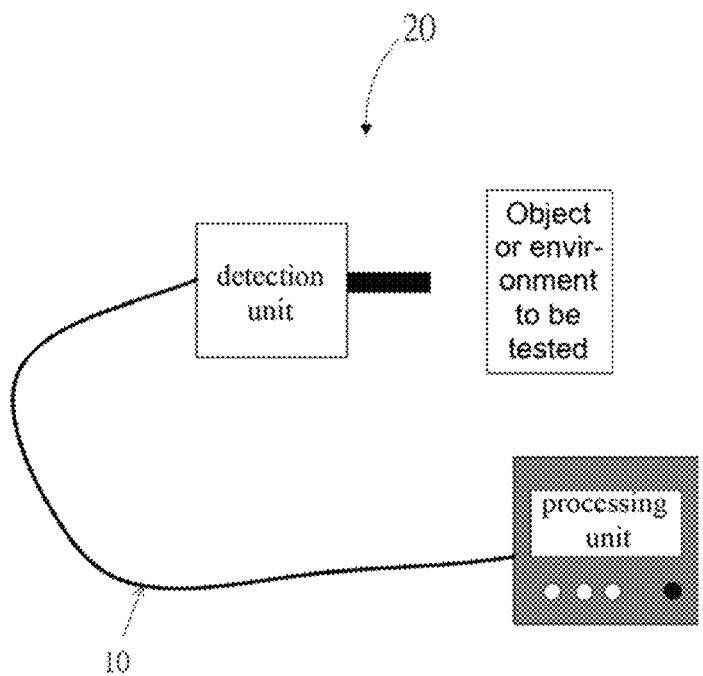
FIG. 11 shows a structure schematic diagram of a detector of one embodiment.

FIG. 11 illustrates a detector 20 of one embodiment using a high temperature resistant wire 10. The detector 20 comprises a processing unit, a detection unit and the high temperature resistant wire 10. A first end of the high temperature resistant wire 10 is connected to the processing unit, and a second end of the high temperature resistant wire 10 is connected to the detection unit.

In one embodiment, the processing unit is a processor containing a processing module. A processing signal of the processing unit is output through an output unit. The output unit can be a display, an alarm, or the like. In one embodiment, the output unit is an LCD display.

The detection unit can be thermal probe, photosensitive probe, gas sensitive probe, force sensitive probe, magnetic sensitive probe, humidity sensitive probe, acoustic sensitive probe, radiation sensitive probe, color sensitive probe, taste sensitive probe, or video probe. In one embodiment, the detection unit is a CCD camera.

In one embodiment, the detector 20 further comprises a power supply. The power supply can be powered by DC power, AC power, or battery power.

In one embodiment, when the detector 20 is in use, turn on the power supply, and the detection unit collects the information of a detection site in real time, such as temperature and image; the information collected by the detection unit is transmitted to the processing unit through the high temperature resistant wire 10, the processing unit processes the information to obtain a processed signal, for example, converting the information to a numerical signal; and the processing signal is output to the output unit through the high temperature resistant wire, for example, the processing signal is output to a display.

The detector 20 can be applied to a high temperature environment with a temperature exceeding 1000° C. For example, parker solar detectors, solar exploration, fire scene detection, high temperature material processing, and aerospace.

The carbon nanotube wire has excellent flexibility and electrical conductivity, and the carbon nanotube wire can be used as a conductor at high temperatures. Boron nitride has super strong covalent bonds, large band gaps and layered structure, therefore, boron nitride has good corrosion resistance, ablation resistance and insulation at high temperatures. The high temperature-resistance wire of the invention is obtained by coating boron nitride on the surface of the carbon nanotube wire; the corrosion resistance of the high temperature resistant wire is increased on the basis of ensuring the conductivity of the high temperature resistant wire. Therefore, the highest temperature at which the high temperature resistant wire can work normally in the air is 1600K, and the highest temperature at which the high temperature resistant wire can work normally in vacuum is 2500K. The application field of carbon nanotube wires is extended. The high temperature resistant wire is light in weight and can be applied to miniature equipment with strict quality and volume requirements.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A high temperature resistant wire comprising:
a carbon nanotube wire, wherein a diameter of the carbon nanotube wire ranges from 0.05 millimeters to 0.25 millimeters; and
a boron nitride layer coated on a surface of the carbon nanotube wire,
wherein the boron nitride layer is coaxially arranged with the carbon nanotube wire, a working temperature of the high temperature resistant wire in the air ranges from 0K to 1600K, and a working temperature of the high temperature resistant wire in vacuum ranges from 0K to 2500K; and a first part of carbon nanotubes of the carbon nanotube wire is graphitized, and a second part of carbon nanotubes of the carbon nanotube wire is not graphitized.

2. The high temperature resistant wire of claim 1, wherein the working temperature of the high temperature resistant wire in the air ranges from 800K to 1600K.

3. The high temperature resistant wire of claim 1, wherein the working temperature of the high temperature resistant wire in vacuum ranges from 800K to 2500K.

4. The high temperature resistant wire of claim 1, wherein the carbon nanotube wire is a twisted carbon nanotube wire, and the twisted carbon nanotube wire comprises a plurality of carbon nanotubes spirally arranged along an axial direction of the twisted carbon nanotube wire.

5. The high temperature resistant wire of claim 1, wherein the boron nitride layer is a continuous boron nitride layer, and the surface of the carbon nanotube wire is completely covered by the boron nitride layer.

6. The high temperature resistant wire of claim 1, wherein a material of the boron nitride layer is hexagonal boron nitride.

7. The high temperature resistant wire of claim 1, wherein a thickness of the boron nitride layer ranges from 0.05 millimeters to 0.20 millimeters.

8. The high temperature resistant wire of claim 1, wherein the carbon nanotube wire consists of a plurality of said carbon nanotubes, and the plurality of carbon nanotubes are free of impurities.

9. The high temperature resistant wire of claim 1, wherein the carbon nanotube wire is an untwisted carbon nanotube wire, and the untwisted carbon nanotube wire comprises a plurality of said carbon nanotubes substantially oriented along a length of the untwisted carbon nanotube wire.

10. A detector comprising:
a processing unit;
a detection unit; and
a high temperature resistant wire comprising a first end and a second end, the first end being connected to the processing unit, and the second end being connected to the detection unit,
wherein the high temperature resistant wire comprises a carbon nanotube wire and a boron nitride layer coated on a surface of the carbon nanotube wire, the boron nitride layer is coaxially arranged with the carbon nanotube wire, a working temperature of the high temperature resistant wire in the air ranges from 0K to 1600K, and a working temperature of the high temperature resistant wire in vacuum ranges from 0K to 2500K; a diameter of the carbon nanotube wire ranges from 0.05 millimeters to 0.25 millimeters, and a first part of carbon nanotubes of the carbon nanotube wire is graphitized, and a second part of carbon nanotubes of the carbon nanotube wire is not graphitize.

11. The detector of claim 10, wherein the working temperature of the high temperature resistant wire in the air ranges from 800K to 1600K.

12. The detector of claim 10, wherein the working temperature of the high temperature resistant wire in the air is 600K, 700K, 800K, 1000K, 1200K, 1400K or 1500K.

13. The detector of claim 10, wherein the working temperature of the high temperature resistant wire in vacuum ranges from 800K to 2500K.

14. The detector of claim 13, wherein the working temperature of the high temperature resistant wire in vacuum is 900K, 1000K, 1400K, 1600K, 1800K, 1900 or 2200K.

15. The detector of claim 10, wherein the boron nitride layer is a continuous boron nitride layer, and the surface of the carbon nanotube wire is completely covered by the boron nitride layer.

16. The detector of claim 10, wherein the carbon nanotube wire consists of a plurality of said carbon nanotubes, and the plurality of carbon nanotubes are free of impurities.

17. The detector of claim 10, wherein the carbon nanotube wire is an untwisted carbon nanotube wire, and the untwisted carbon nanotube wire comprises a plurality of said carbon nanotubes substantially oriented along a length of the untwisted carbon nanotube wire.

18. The detector of claim 10, wherein a thickness of the boron nitride layer ranges from 0.05 millimeters to 0.20 millimeters.

* * * * *

UNITED STATES PATENT AND TRADEMARK OFFICE
CERTIFICATE OF CORRECTION

PATENT NO. : 11,527,336 B2
APPLICATION NO. : 16/448104
DATED : December 13, 2022
INVENTOR(S) : Xin-He Yang et al.

It is certified that error appears in the above-identified patent and that said Letters Patent is hereby corrected as shown below:

On the Title Page

Please replace Item (30) regarding "Foreign Application Priority Data" with the following:
(30) Foreign Application Priority Data
Jan. 25, 2019 (CN)................................201910073721.8

Signed and Sealed this
Thirtieth Day of January, 2024

Katherine Kelly Vidal
*Director of the United States Patent and Trademark Office*